Patented Jan. 22, 1929.

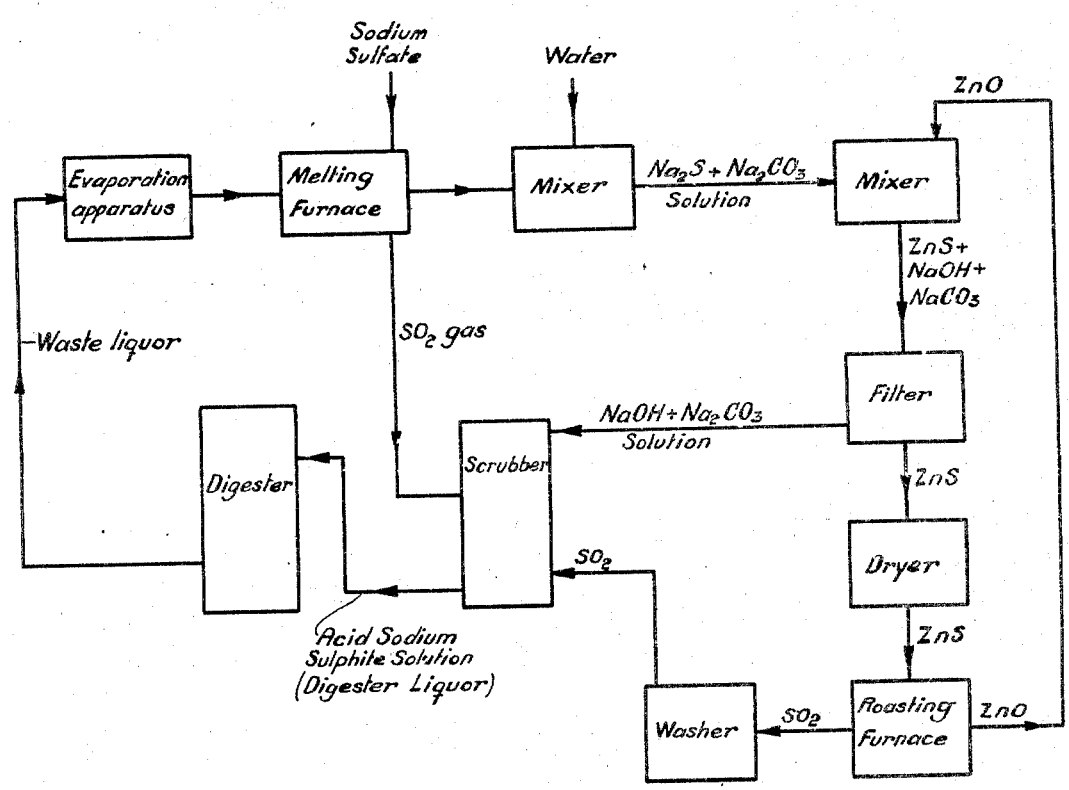

1,699,808

UNITED STATES PATENT OFFICE.

ERIK LUDVIG RINMAN, OF DJURSHOLM, SWEDEN.

METHOD OF TREATING WASTE LIQUOR.

Application filed April 15, 1926, Serial No. 102,356, and in Sweden April 17, 1925.

The present invention relates to a method of treating such waste liquor as is obtained in the production of cellulose, i. e. chemical paper pulp, by boiling cellulose-containing materials with sodium sulphite solution or acid sodium sulphite solution, for the purpose of producing fresh digester liquor from the waste liquor.

The invention consists principally in that the waste liquor formed during the boiling is evaporated—certain substances in said waste liquor, such as fermentable sugar, organic acids or salts, being separated previously, simultaneously or subsequently, if desired—after which the combustible substances of the evaporated mass thus obtained—to which substances fuel may be added, if desired—are combusted in such manner that the sodium compounds in the waste liquor are transformed into sodium sulphide, or sodium sulphide and soda. After the residue of combustion has subsequently been dissolved in water or other suitable washing liquid, so that a preferably strong solution is obtained, said solution is treated, preferably under heat and while stirring the same, with an oxide or several oxides of such metals the sulphur compounds of which are insoluble in caustic soda lye, so that all $Na_2S$ is transformed into NaOH, while the metal oxide or oxides form an equivalent quantity of metal sulphide or sulphides. The metal sulphide or sulphides is or are afterwards separated from the solution which will then only contain sodium hydrate, soda, and possibly, small quantities of sodium sulphite and sodium sulphate. The solution is now treated—if desired, after suitable dilution, for instance to a percentage of 1 to 1.5% $Na_2O$—with sulphur dioxide gas or sulphur dioxide solution until the same has obtained a sufficient percentage of such dioxide in order to be used as digester liquor. The metal sulphides obtained in the course of production are roasted in a suitable furnace so that oxide or oxides is or are formed, which are again used in the manufacture, and also sulphur dioxide which after suitable washing may be used for the production of fresh digester liquor.

The accompanying drawing shows a flow-sheet of the present method.

Regarding the details of the method the following is to be observed. From the waste liquor obtained from a boiling, alcohol may first be produced, if desired, according to well known methods, after which the residue obtained is treated according to the present method. The waste liquor obtained may, however, also be directly evaporated, when escaping volatile acids may be taken care of, if desired. Further, one may of course extract from the evaporated waste liquor such organic salts as it is desired to recover, before the mass is further treated.

As against evaporation of ordinary sulphite waste liquor the evaporation of the waste liquor here referred to offers the advantage that the same does not incrustate the evaporation apparatus, and for this reason the evaporation may be driven very far, for instance to a percentage of water of 25 to 15 percent, particularly if the evaporation is carried out towards the end at temperatures below 100° C. For burning the obtained evaporated waste liquor such melting furnaces may suitably be used as are usually employed in the sulphate cellulose manufacture. One may then retain the usual rotary drying furnace and introduce the lye from the evaporation apparatus into the same, If, however, a waste liquor having a percentage of water of 20 percent at the most, has been obtained already in the evaporation apparatus, such waste liquor may also be directly introduced into the melting furnace. In this furnace, or previously, so much sodium sulphate is of course added, that the loss of sodium in the manufacture is compensated. A larger quantity of sodium sulphate than that required for compensating the said loss may, however, also be added. In view of the fact that the quantity of organic substances in a sulphite waste liquor is substantially the same as in a sulphate waste liquor, it may be suitable, in order to obtain the same working conditions as those familiar from the sulphate cellulose manufacture, to add such quantity of sodium sulphate that the total quantity of sodium salts for each ton cellulose corresponds to that usual in the sulphate cellulose manufacture. By the addition of such extra quantity of sodium sulphate a greater quantity of sodium hydrate or caustic soda lye and soda is obtained than that required for the manufacture. This may be alvantageous since such lye is very suitable to be used—after causticizing, if desired,—as digester liquor in the production of soda cellulose, since said lye does not contain any impurities unsuitable for such boiling, but only small quantities of sodium sulphite, sodium sulphate, and zincate and plumbate in case the sodium sulphide solution has been treated with these substances.

The hot gases of combustion escaping from the melting furnace are of course utilized in well known manner in order to recover the heat value of the same, for instance for generating steam. If desired, additional fuel may of course be introduced into the melting furnace.

The melted sodium sulphide obtained in the melting furnace, with the soda present therein, is received in the usual manner in a mixing apparatus, the lye obtained, or at least that portion thereof which is to be used for producing sulphite acid, being preferably made as strong as possible. When a sodium sulphide solution of suitable strength has been obtained, said solution is treated with suitable metal oxides, such as oxides of zinc, lead, iron, nickel, manganese, copper, cadmium, or mixtures thereof. Of these metal oxides the zinc and lead oxides are the most active in view of the fact that they are soluble in caustic soda lye. The relieving of the solution from sodium sulphide therefore takes place most rapidly with the use of these substances and is effected more easily in proportion as the percentage of sodium sulphide in the solution is high and the percentage of soda is small. A solution having a small percentage of sodium sulphide may be made more easily treated, however, by causticizing the same by adding caustic soda lye, or by causticizing the soda in the same.

The treatment is effected most rapidly, however, if instead of metal oxides zinc or lead oxide dissolved in caustic soda lye, i. e., sodium zincate or sodium plumbate is used. This may be of importance, particularly if impure oxides of these metals are available, and it is desired to remove the impurities before use. Zinc or lead is in such case first extracted from the impure oxides, for instance by the use of caustic soda lye obtained during the manufacture, and the solution thus obtained is used either alone or together with oxides. The treatment may, for instance, be finished up by the use of zincate or plumbate, as these substances remove the sodium sulphide even if only a very slight excess is used.

The metal sulphides formed during the treatment above described are obtained in a very easily filtered state if the treatment is carried out at temperatures of 100° C. and more, and if desired, under pressures corresponding to temperatures of up to 150 to 180° C. If the lye obtained still contains sulphur compounds of an injurious nature, such as sodium thiosulphate and so forth, such compounds may easily be removed by treating the solution with reducing agents, such as metallic sodium or zinc, or still more easily by oxidation, for instance with chlorine, particularly if this treatment is carried out at high temperatures.

If a solution has been treated with a too large quantity of zinc oxide or lead oxide, so that the lye contains sodium salts of such metals, such salts may be removed for the most part by adding a sodium sulphide solution. If it is desired to free a lye completely from sodium zincate or sodium plumbate, this may be effected by leading carbon dioxide or sulphur dioxide into the lye until the said substances have become completely precipitated. If it is desired to produce a pure soda solution it is necessary, besides the treatment with carbon dioxide, also to remove sulphur dioxide and sulphuric acid, for instance by treatment with barium dioxide. If the caustic soda lye obtained is to be used in a soda cellulose mill, however, a slight percentage of for instance sodium zincate, sodium sulphite or sodium sulphate is not injurious, rather the contrary.

When the metal sulphides have been precipitated they are separated from the lye by filtration. Since a complete washing of the metal sulphides is not necessary, it is suitable for said filtration to use rotary filters. It is to be observed that the washing shall not be driven so far that any of the metal sulphides are disolved. The separated lye, or the portion of the same which is to be used for the production of digester liquor, is suitably diluted to a concentration of from 12 to 15 gr. $Na_2O$ per liter and is treated, for instance in scrubbers charged with acid-proof stone, with sulphur dioxide gas. When the lye has obtained a sufficient percentage of $SO_2$ in this manner, the gas discharged from the digester is introduced into the same in the usual manner, so that digester liquor is obtained. It is most suitable to treat the lye at first, when it has its greatest capacity of absorbing $SO_2$, with the most diluted sulphur dioxide gases obtained in the process, for instance the gases of combustion from the melting furnace, and afterwards to continue the treatment with more concentrated gases. It is of course also possible to mix the soda solution with a solution of $SO_2$ in water. The metal sulphides filtered off are preferably dried before being roasted. This drying may be carried out in an ordinary rotary drying drum by direct or indirect heating. Indirect heating is to be preferred, however, since with the same formation of dust is avoided. For such drying it is then also possible to use sulphur-containing gases of combustion of low temperatures.

The metal sulphides thus separated are subjected to roasting in suitable furnaces so that the largest quantity possible of oxides and sulphur dioxide is obtained. For such roasting Herreshof furnaces may be used with advantage, of the type commonly used for roasting iron pyrites or zinc blende. If the metal sulphides contain sodium hydrate or soda, such sodium may form sulphate during the roasting. An unnecessarily large quantity of alkali should therefore not be allowed to remain with the metal sulphides. An admixture of carbon may, however, prevent the formation of sulphuric acid during the roasting, but on the other hand it can not reduce already formed sodium sulphate, since such reduction requires higher temperatures.

The metal sulphides obtained by the treatment above described are of the nature to raise a dust during roasting. Besides, a portion of the sulphur escapes in the state of sulphuric acid. In order that this dust and the sulphuric acid formed shall not be lost, it is suitable to wash the gases from the roasting with a circulating washing liquid which takes up said dust and acid. When said washing liquid has obtained a sufficiently high percentage of sulphuric acid and metal sulphate, metal sulphides are added to the same as long as sulphuretted hydrogen is developed. This sulphuretted hydrogen is suitably led into the roasting furnace in order to be burnt to sulphur dioxide. The sulphate solution obtained is afterwards mixed with a suitable quantity of carbon, saw dust, or other reducing agent, so that the sulphates are reduced to sulphites and metal sulphides when afterwards roasted. The mixture thus obtained is afterwards dried, either alone or together with the metal sulphides, and is finally introduced into the roasting furnace either alone or together with the latter.

Another manner of treating the gases formed during the roasting of the metal sulphides, particularly the roasting of dried zinc sulphide, consists in subjecting the gases, which would preferably first be freed from dust as much as possible according to well-known methods, to washing with concentrated sulphuric acid in order to remove sulphuric acid contained in the gases, after which the gases are further treated for recovery of the $SO_2$ contained in the same. The sulphuric acid recovered in this manner, and which might contain metal oxides separated from the gases simultaneously with the sulphuric acid, may afterwards suitably be used for producing from common salt hydrochloric acid and sodium sulphate, the latter to be again used in the process. If in the carrying out of the present process of regeneration more sodium sulphide solution and caustic soda and sodium carbonate solution are produced than the quantity required in the process for the production of fresh digester liquor, it is therefore advantageous during the roasting of the metal sulphides to obtain such high percentage of sulphuric acid in the gases formed that the quantity of sulphur dioxide in said gases only corresponds to that required for the production of the digester liquor. It is of course possible to use suitable contact substances in well-known manner in order to increase the quantity of sulphuric acids in the gas obtained during the roasting of the zinc sulphide. By producing hydrochloric acid and sodium sulphate in the manner above stated from common salt and sulphuric acid obtained in the process, or by producing hydrochloric acid and sodium sulphate directly from the sulphur dioxide gases formed and common salt according to the method of Hargreaves and Robinson, it is possible to obtain soda and sodium hydrate as by-products of the present process in a cheaper manner than according to any other method. Since the cellulose production only requires approximately 100 kg. $Na_2O$ in the digester liquor per each ton cellulose, it is possible simultaneously to extract approximately 300 kg. $Na_2O$ in the state of soda and sodium hydrate lye, or in the state of soda-containing sodium hydrate lye, to be used for other purposes, without using more sodium salts in the melting furnace than the quantity usual in the sulphate cellulose production. Soda is easily extracted from the solution of sodium hydrate and soda, for instance by evaporation to crystallization and subsequent calcination with gases of combustion containing carbon dioxide. The sodium hydrate lye simultaneously won is most easily obtained with a slight contamination of zinc, which, however, renders it particularly suitable as digester liquor for the soda cellulose production.

The following example serves to illustrate a manner in which the present method may be carried out. When producing cellulose by indirect boiling there are used, for instance, for each ton cellulose, 7 cu. m. white liquor containing 12 gr. $Na_2O$ and 40 gr. $SO_2$ per liter of the liquor. When the pressure has been blown off the digester contains 8 cu. m. waste liquor per ton cellulose. Of said quantity 6.4 cu. m. waste liquor may be extracted in the diffusors, that is to say 80 percent of the entire quantity. This waste liquor is neutralized with lime and allowed to ferment, after which the spirit formed is distilled off. A residue of 8 cu. m. is then obtained, holding 67 kg. $Na_2O$ and a quantity of sulphur compounds corresponding to 33.5 kg. sulphur. This waste liquor is now evaporated in the evaporation apparatus to a percentage of water of 20 percent, and is then introduced into the melting furnace, and simultaneously 45 kg. $Na_2SO_4$ are added. In the melting furnace a molten mass is formed, consisting of 42 kg. $Na_2O$ in the state of soda and 42 kg. $Na_2O$ in the state of $Na_2S$, 5 kg. $Na_2SO_4$ escaping with the gases of combustion. With said gases also escape 42 kg. $SO_2$ and 2 kg. $SO_3$. From said molten mass a 25 percent solution is made in the mixing apparatus, said solution being afterwards treated at boiling temperature with 55 kg. ZnO. This treatment requires about one hour's time. The 25 percent solution afterwards contains 42 kg. $Na_2O$ in the state of soda and 42 kg. $Na_2O$ in the state of hydrate, and also traces of sodium zincate. The zinc sulphide is filtered off on rotary filters and washed until the washing water only contains 1 percent $Na_2O$. In this manner 65 kg. zinc sulphide are obtained together with 65 kg. water holding 0.65 kg. $Na_2O$. This zinc sulphide is afterwards dried and burnt together with 7 kg. zinc sulphate and 0.7 kg. carbon, when 55 kg. ZnO are obtained and in the gases of combustion 43 kg. $SO_2$. The 25 percent solution of caustic soda lye and soda obtained from the filter, together with the washing water, is afterwards diluted to a percentage of 14 gr. $Na_2O$ per liter, and is first used for extracting 43 kg. $SO_2$—gas from the cooled and washed gases of combustion from the melting furnace in a scrubber, after which the liquid is used in another scrubber for absorbing another 43 kg. $SO_2$—gas from the gases escaping from the roasting furnace. In this manner a solution is thus obtained which contains 84 kg. $Na_2O$ in the state of $Na_2SO_3$. The best absorption of the $SO_2$—gas is obtained if the gases issuing from the scrubber for the roasting gases are brought together with the gases from the melting furnace and then together washed in the scrubber for the last-mentioned gases. The sodium sulphite solution thus obtained is afterwards brought to a total percentage of 4% $SO_2$ by the introduction of gases from the digester and a sulphur furnace, through which a ready digester liquor is obtained.

If the cellulose is produced by digesting the cellulose-containing materials with neutral or basic sodium sulphite, the method of treating becomes substantially the same as that above described.

I claim:

1. A method of treating waste liquor obtained in the production of paper pulp by boiling with acid sodium sulphite solution, which consists in evaporating the waste liquor, after which the combustible matter of the evaporated mass is combusted in such manner that the sodium compounds present in the waste liquor are transformed into sodium sulphide and soda, after which the residue of combustion is dissolved in water and is treated with an oxide of such metals the sulphur compounds of which are insoluble in caustic soda lye, so that all $Na_2S$ is transformed into sodium hydrate, after which the solution free from $Na_2S$ thus obtained is treated, after separating the precipitate, with sulphur dioxide for the purpose of producing fresh digester liquor.

2. The method according to claim 1, in which the treatment of the sodium sulphide solution with metal oxides is carried out at a temperature of at least 100° C.

3. The method according to claim 1, in which the sodium sulphide solution is treated with an oxide dissolved in caustic soda lye of such metals the sulphur compounds of which are insoluble in caustic soda lye.

4. The method according to claim 1, in which metal sulphides obtained in the process, are transformed by roasting into oxides to be re-used in the process, sulphur dioxide and sulphuric acid being recovered from the gases of combustion from such roasting.

ERIK LUDVIG RINMAN.